United States Patent

Sri-Jayantha et al.

[11] Patent Number: 5,963,392
[45] Date of Patent: Oct. 5, 1999

[54] METHOD AND APPARATUS FOR DISK SHOCK PROTECTION

[75] Inventors: Sri Muthuthamby Sri-Jayantha; Vijayeshwar Das Khanna, both of Ossining; Suresh Kumar, Croton-on-Hudson; Hien Phu Dang, Nanuet, all of N.Y.

[73] Assignee: International Business Machines Corporation, Armonk, N.Y.

[21] Appl. No.: 08/869,562

[22] Filed: Jun. 5, 1997

[51] Int. Cl.[6] ........................................................ G11B 5/54
[52] U.S. Cl. ............................................ 360/75; 360/78.04
[58] Field of Search .................................. 360/135, 133, 360/75, 105, 78.04

[56] References Cited

U.S. PATENT DOCUMENTS

| | | | |
|---|---|---|---|
| 4,933,785 | 6/1990 | Morehouse et al. | 360/78.04 |
| 5,172,287 | 12/1992 | Ishida | 360/105 |
| 5,189,575 | 2/1993 | Onooks et al. | 360/105 |
| 5,371,637 | 12/1994 | Yamada | 360/75 |
| 5,482,497 | 1/1996 | Gonnella et al. | 451/57 |

FOREIGN PATENT DOCUMENTS 62-157379  7/1987  Japan .................................. 360/75 N

OTHER PUBLICATIONS

Aoyagi et al, "Sliders," IBM Technical Disclosure Bulletin, vol. 37, No. 5, May 1994, pp:119 & 577.
*Computer Technology Review*, Dynamic Head Loading Reduces Failures in Hard Drives,1994, pp:69–74.

*Primary Examiner*—Aristotelis M. Psitos
*Assistant Examiner*—K. Wong
*Attorney, Agent, or Firm*—Francis L. Conte

[57] ABSTRACT

A data storage device 12 includes a disk 14 having a surface zone 14a for storing data, and an access head 18 mounted on a slider 20 for writing data to and reading data from the data zone. The head 18 flies across the data zone 14a to access selected data tracks during spinning of the disk. And, the slider 20 seeks a predetermined shock buffer zone 30 atop the spinning disk, where critical data is not stored, during an idle mode for confining thereto any shock induced contact between the slider and disk surface.

20 Claims, 4 Drawing Sheets

METHOD AND APPARATUS FOR DISK SHOCK PROTECTION

BACKGROUND OF THE INVENTION

The present invention relates generally to direct access storage devices, and, more specifically, to shock protection thereof.

A direct access storage device (DASD) in the exemplary form of a conventional computer hard disk drive (HDD) includes a data storage disk having thousands of concentric data tracks along which data is written or read magnetically. The disk spins during operation, and a transducer or access head flies atop the disk surface on an air bearing to prevent undesirable contact therebetween. The access head is supported atop a slider which effects the air bearing upon spinning of the disk, and the slider in turn is supported by a suitable suspension which is selectively pivoted by an actuator to position the access head at any specific one of the data tracks.

Hard disk drives for portable computer applications require higher than conventional levels of shock immunity. Operating shock of the order of 120 g/3 ms is known to cause damage to head-disk-interface (HDI). The mechanism for HDI damage during operating condition is not well defined. Thus any systematic refinement to enhance the failure threshold of HDI is yet to be developed.

Other than removing the slider from the disk surface using Load/Unload (L/UL) technology no other prior art is known in this field for avoiding the HDI damage. Since unloading the slider from the disk surface and then reloading it back again is time consuming, this is done either intermittently or during power-down. Hence, a technique for minimizing the HDI damage without compromising performance during operational mode is highly desirable.

The slider in a HDD remains mostly in an idle operating position determined by its most recent read-write, or access, operation. The actual read or write operation takes only a fraction of the operating time in a laptop application. The user data is stored in the conventional data-zone that spans the disk surface. An outer diameter landing zone is dedicated for the slider to rest during the non-operating condition. The vulnerability of this configuration is that the slider is positioned over the data-zone during all operating times, including the idle mode. Thus any operating shock is prone to damage the data if the shock level exceeds specification.

Under operating conditions, the slider flies over the disk surface by maintaining an air bearing between itself and the disk. A moderate shock applied perpendicular to the plane of the disk can cause the slider to move significantly. This motion of the slider can disrupt the air bearing and cause contact between the slider and the disk surface. Since the operational disk is spinning, any contact between the slider and the disk can result in damage to the protective overcoat on the disk surface and to the magnetic layer underneath. If the contact occurs over an area where user data is stored, the damage to the magnetic layer can result in irrecoverable data loss.

The exact mechanics leading to HDI damage under operating conditions is not yet well understood. An experiment to determine the onset of slider disk contact due to shock was conducted. In this experiment, sensitive accelerometers were mounted on the arm of a 2.5" disk drive and the output monitored while external shocks were applied. An increase in high frequency noise output of the sensor indicated contact between the slider and the disk.

The contact threshold is fairly insensitive to slider position, but sensitive to shock pulse width. From a dramatic increase in output, the contact threshold (for shock pulses with medium width) was determined to occur at about 125 g. Since hard errors were seen in drives that had been subjected to shocks of about 160 g, one can conclude that data loss occurs soon after slider-disk contact.

Experimental testing of computer systems indicate that shock levels on disk drives can exceed the operating shock threshold easily. Shock levels up to about 582 g's were seen on the drive when the system was dropped by a few inches. Since any user is likely to subject the system to such drops due to inadvertent mishandling even when the unit is operational, the probability of data loss due to HDI damage from operating shock remains high.

Accordingly, it is desirable to increase data integrity in the data storage disk subject to shock induced contact between the slider and disk surface.

SUMMARY OF THE INVENTION

A data storage device includes a disk having a surface zone for storing data, and an access head mounted on a slider for writing data to and reading data from the data zone. The head flies across the data zone to access selected data tracks during spinning of the disk. And, the slider seeks a predetermined shock buffer zone atop the spinning disk during an idle mode for confining thereto any shock induced contact between the slider and disk surface.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
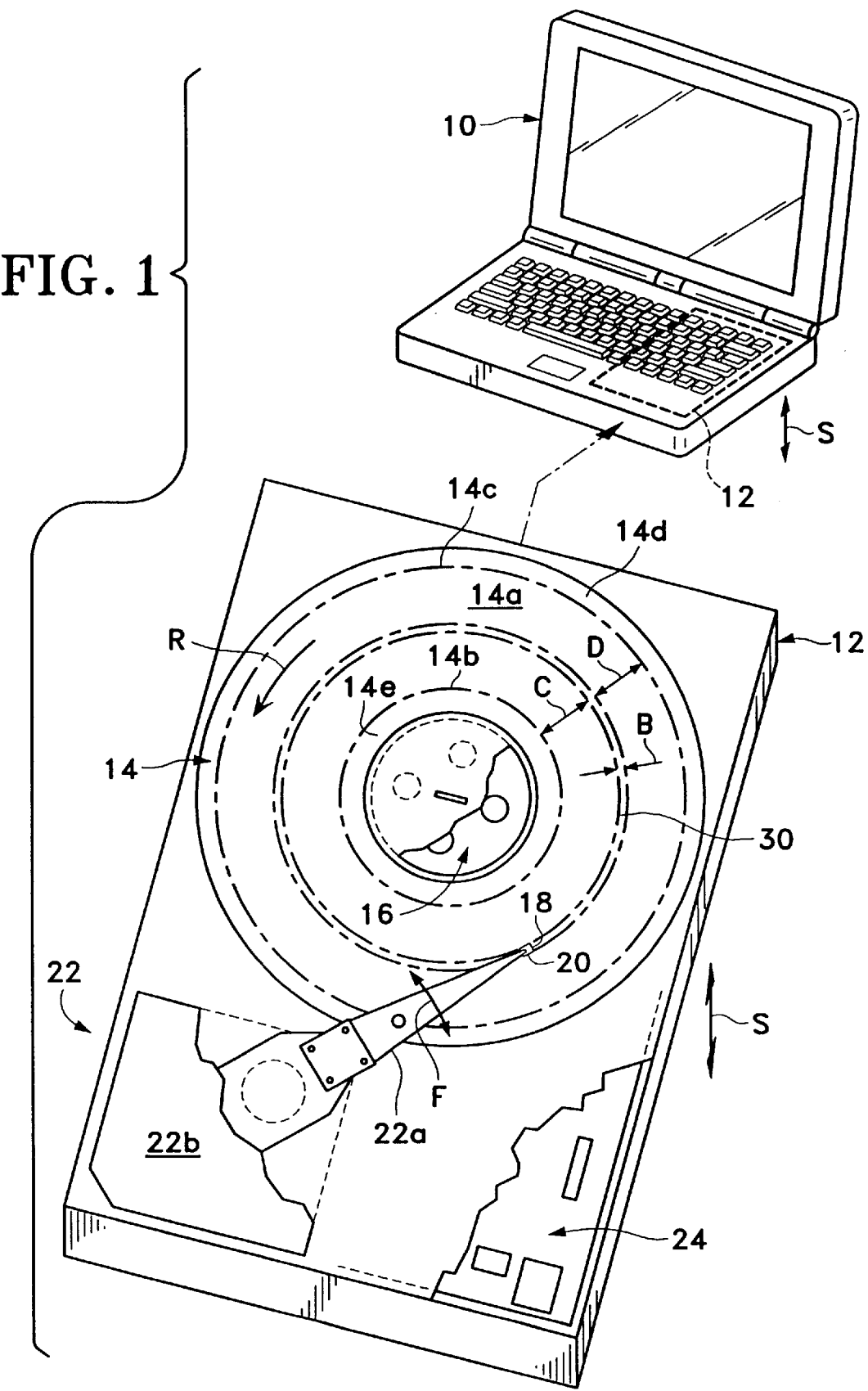
FIG. 1 is a schematic representation of an exemplary data storage device for a portable, laptop computer including a data storage disk having a predetermined shock buffer zone thereon in accordance with an exemplary embodiment of the present invention.

Illustrated in FIG. 1 is an exemplary mobile or portable laptop computer 10 including therein a data storage device 12 in accordance with an exemplary embodiment of the present invention. The storage device 12 is commonly referred to as a hard disk drive and is shown removed from the computer 10 in FIG. 1 for clarity of presentation. But for the present invention, the data storage device 12 may take any conventional form for suitably writing data to and reading data from a data storage disk 14.

In the exemplary embodiment illustrated, the disk 14 is a conventional magnetic disk in which data may be stored magnetically. The disk 14 has a flat annular surface which defines a data field or zone 14a which is in the form of an annulus extending radially between an inner boundary 14b at the inner diameter of the disk, and an outer boundary 14c near the outer diameter of the disk. The data zone 14a is conventionally configured for magnetically storing data in a suitable format, and typically includes thousands of concentric data tracks.

The disk 14 is suitably mounted at its inner diameter to a conventional electrical motor 16 which is suitably powered for spinning or rotating the disk 14 at a suitable rotational speed R when desired.

In order to magnetically access the disk 14, a conventional transducer or access head 18 is mounted on a slider 20 for magnetically writing data to and reading data from the data zone 14a. Conventional suspension and actuating means 22 are provided for flying or selectively traversing the access head 18 at various tracks positions radially across the data zone 14a. The flying means 22 include a suitable suspension 22a which suspends the access head 18 and slider 20 above the surface of the disk 14, with the suspension 22a being suitably joined to a conventional position actuator 22b which is effective for traversing or flying the head and slider radially inwardly and outwardly along the direction F to address the individual tracks on the disk 14. The actuator 22b may take any conventional form, such as a typical voice coil motor, which is operated to position the access head 18 at any of the tracks between the inner and outer boundaries 14b,c.

The data storage device 12 is typically a discrete hardware device having its own controller 24. The disk controller 24 may have any conventional form including suitable electronic circuits for controlling spinning of the disk 14 and flying of the slider and head thereon. The typical disk 14 may include a conventional Load/Unload (L/UL) zone 14d at its outer diameter to which the slider and head are initially loaded into operational position atop the disk 14, and from which the slider and head are unloaded when desired. Load and unload typically requires hundreds of milliseconds to effect, with corresponding rubbing wear between the components.

Alternatively, the disk 14 may include a contact start/stop (CSS) zone 14e at its inner diameter which provides a rest zone for the slider 20 to be temporarily positioned during a power-off or non-operational condition. In this mode, the slider 20 moves to the CSS zone 14e and rests directly atop the disk surface when the disk is powered down.

Figure 2:
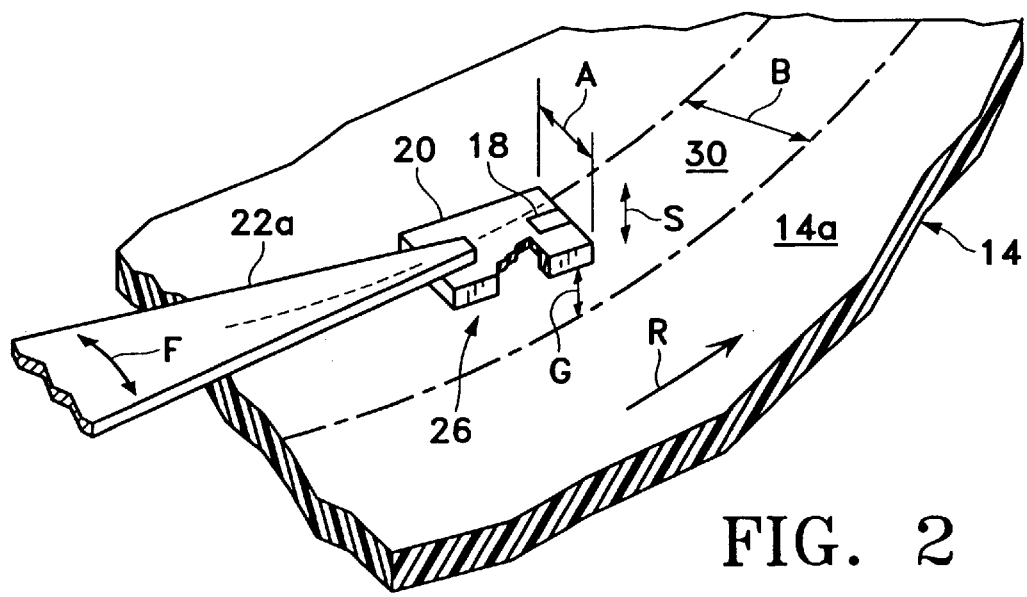
FIG. 2 is an enlarged portion of the data storage disk illustrated in FIG. 1 showing a portion of the shock buffer zone and idling slider thereatop.

As shown in more detail in FIG. 2, the slider 20 is conventionally configured with one, or more, rails and corresponding surface area for effecting an air bearing 26 which supports the slider and head vertically atop the data zone 14a at a suitable gap G. As the disk 14 spins during operation, a cushion of air develops between the slider 20 and the data zone 14a to suspend the slider and head above the data zone 14a and normally preventing contact therebetween. In normal operation, therefore, the slider 20 slides radially inwardly and outwardly over the data zone 14a to address any of the specific data tracks therein in a conventional manner. The slider 20 and head 18 do not contact the disk surface in the region of the data zone 14a for preventing undesirable wear or damage thereto. However, the slider 20 is positioned over the data zone 14a during all operating times, including the idle mode wherein the slider 20 is simply stationary at its last access location awaiting a signal to proceed to its next location.

In its idle mode, the slider 20 may damage portions of the data zone 14a when subjected to excessive shock loads. As shown in FIG. 1, the computer 10 may undergo a vertical shock load designated S which is directed perpendicularly to the surface of the disk 14. The shock load S is also illustrated in FIG. 2 which can cause the slider 20 to impact the data zone 14a when the air bearing 26 is breached due to excessive shock. Contact of the slider 20 with the spinning disk 14 can physically damage the surface thereof and thereby corrupt any data stored along the rubbed region.

Figure 3:
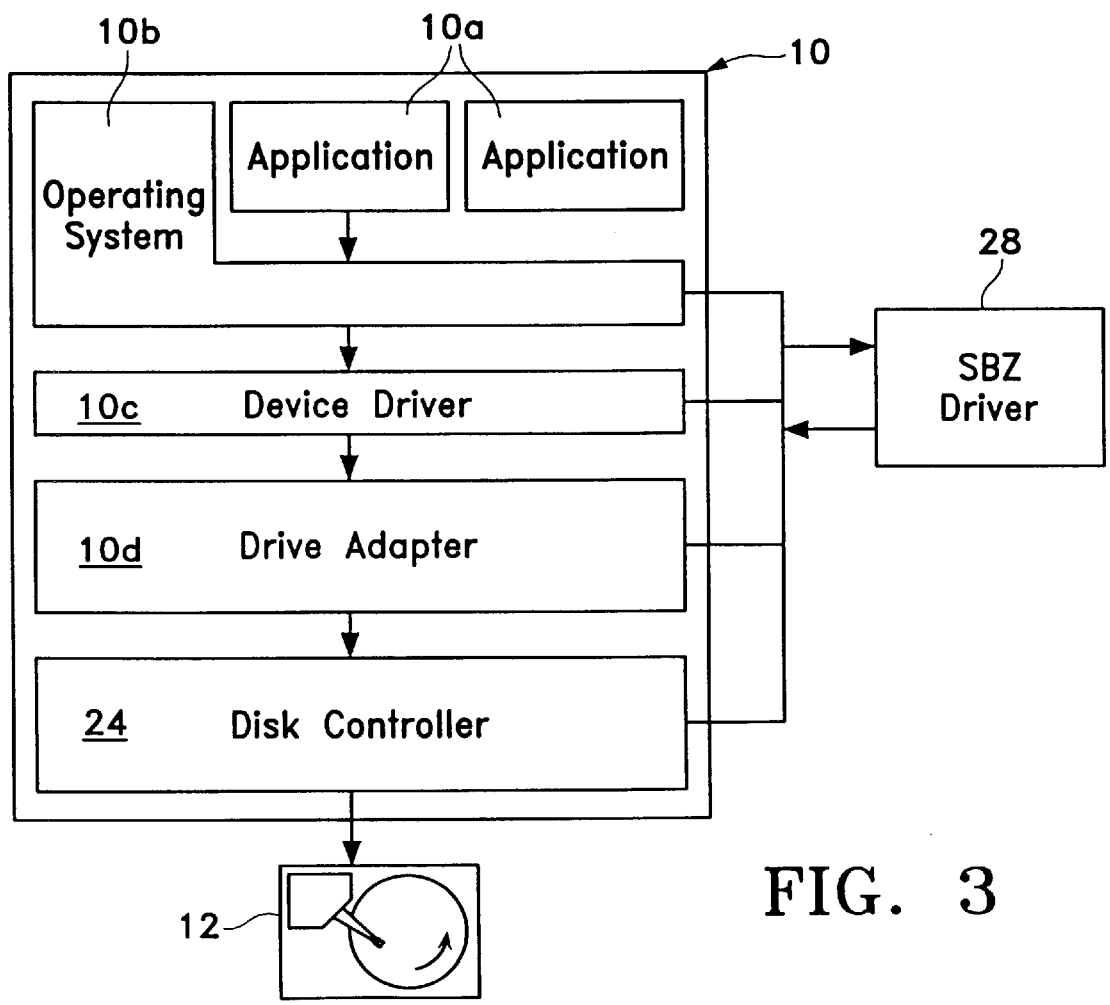
FIG. 3 is a schematic representation of the computer illustrated in FIG. 1 including the data storage device mounted therein, and a driver for implementing the shock buffer zone in various, alternative configurations.

In accordance with the present invention as illustrated in FIG. 3, means in the form of a suitable driver 28 are provided for sending or seeking the slider 20 to a predetermined Shock Buffer Zone (SBZ) 30, shown in FIGS. 1 and 2, atop the spinning disk 14 during the disk idle mode when data is neither written to nor read from the data zone 14a.

FIG. 2 shows the basic concept of the SBZ 30 wherein a portion of the normal data zone 14a is reserved. The slider 20 is positioned in this zone during the idle mode. The disk surface is magnetically useable and formatted as any other region on the disk surface but it does not hold user files for permanent storage. It however, requires the conventional servo-pattern necessary for track-follow or seek. When a disk drive is used with SBZ, the slider is programmed to return to the center of the buffer zone after completing a read or write operation. As long as the slider is on the buffer zone, the chance of corrupting user data due to shock damage is minimized. Thus, a small but certain operating shock limit can be increased to much larger value with a low probability of data loss.

Accordingly, the SBZ 30 should not contain any data requiring high data integrity in the event of damage thereto. However, the SBZ 30 may be used for the storage of temporary data, or recoverable data, for which damage thereto may be acceptable for exploiting full storage capacity of the disk.

Figure 4:
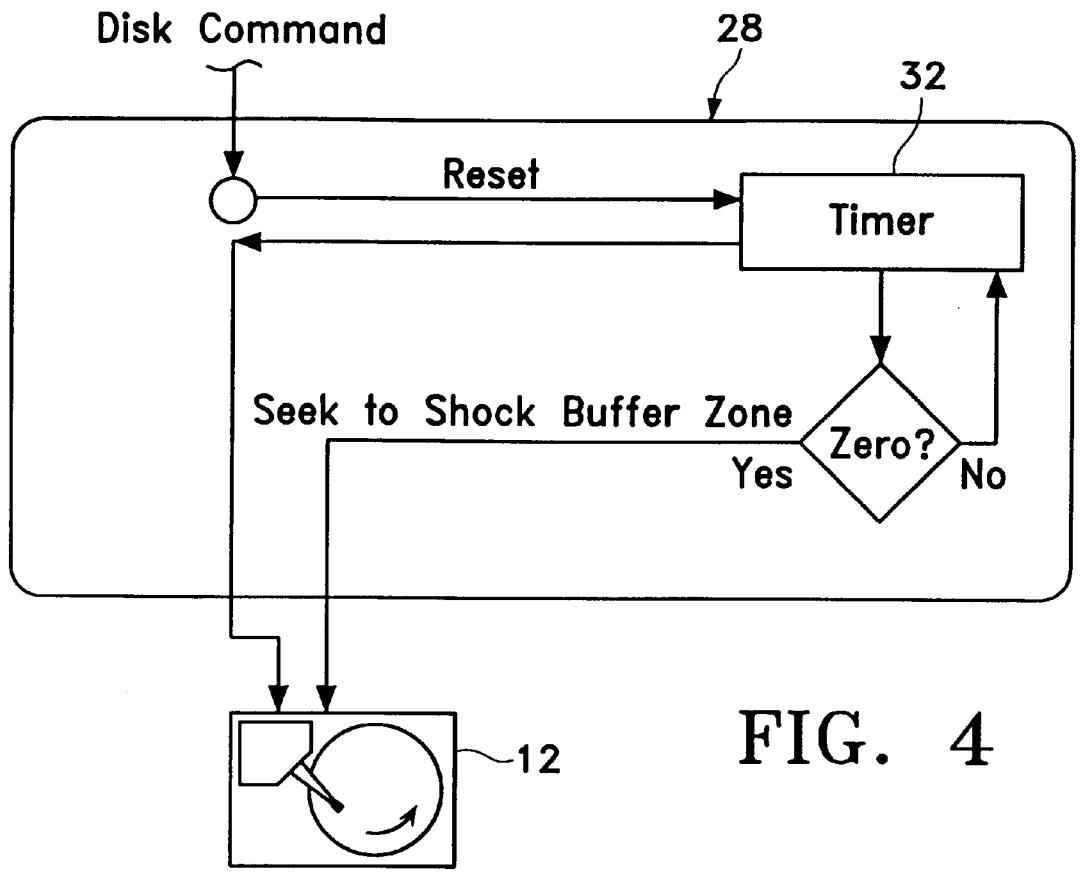
FIG. 4 is a schematic representation of an exemplary form of the shock buffer zone driver illustrated in FIG. 3 including a delay timer therein.

The disk drive 12 can be programmed such that the slider 20 returns to the buffer zone 30 either immediately after every read/write request, or after a suitable time has elapsed by using a suitable timer 32 as shown schematically in FIG. 4. It is well known that typical usage of the disk drive in a computer includes bursts of activity followed by long periods where the disk is not accessed. In fact, most of the conventional memory management modes of the drive depend on the disk being idle for long periods, and active only for short periods.

Generally, the disk 14 is accessed only when the user reads in a new file, updates a file, or loads in a program. In addition, the disk is accessed by the operating system for virtual memory swapping. This type of access also consists of a small period of many accesses during which some pages from memory are written to disk and other pages are read from the disk and loaded into memory. Typically, such page swaps occur when the user switches between two application programs that are simultaneously running: the program that is currently active is written to disk as it is sent to the background, and the program that is inactive is reloaded as it gets sent to the foreground.

In order to gain better performance at the expense of data reliability, the slider 20 can be allowed to remain over that data zone for a small period in which disk activity is expected to continue. The timer 32 can be adjusted either manually by the user, or dynamically to provide good performance while providing adequate data protection.

Accordingly, the SBZ 30 provides a method for enhancing data integrity stored in the data zone 14a at the expense of a small reduction in overall disk storage capacity. The access head 18 flies to various locations in the data zone 14a for writing data thereto or reading data therefrom. During idle, the slider 20 seeks to or is sent to the defined SBZ 30 so that any excessive shock will rub the slider 20 on the disk 14 solely within the confined region defined by the SBZ 30.

As shown in FIG. 2, the slider 20 and SBZ 30 have corresponding widths A and B, with the SBZ width B being at least as large as the slider width A. The width B of the buffer zone 30 should be at least one slider width A. In practice, it might be necessary to increase the width of the buffer zone by a small amount on either side of the slider, since any damage to the disk surface due to operating shocks can have a finite size.

Moreover, the HDD can be expected to sustain linear shocks in the plane of the disk as well as angular shocks simultaneously with that of a shock perpendicular to that of the disk surface. While perpendicular shocks will be primarily responsible for creating HDI damage, in-plane linear shocks and angular shocks can move the slider away from its idling position as it impacts the disk. Thus, the actual damage can occur at some distance away from the center point of the idling slider. The width B of the shock buffer zone preferably includes shoulders on each side in addition to the slider width that are enough to accommodate the sideward motion of the slider for shocks within the specification.

The size and configuration of the SBZ is specifically selected based on the size and configuration of the slider 20 and access head 18. The SBZ is intended to cover a predetermined, fixed area or annulus which is subject to shock damage from impact by the slider 20. Since two rail sliders are conventionally known, shock damage corresponding thereto is limited to two radially spaced apart annular bands. In this configuration, the undamaged region between the two bands can still be used for safely recording data, with the SBZ therefore being configured as two radially spaced apart annular bands.

More than one buffer zone can be used in a single HDD for greater seek performance. However, since each buffer zone reduces the overall capacity of the drive, it is preferred that only one shock buffer zone be used. Theoretically, the shock buffer zone can be placed anywhere on the disk surface. Four different locations and their relative advantages and disadvantages are disclosed below.

A fixed shock buffer zone 30 can be placed in the middle of the disk surface, at the disk mid-diameter (MD) as illustrates in FIGS. 1 and 2. The primary advantage of a MD SBZ is in terms of potential performance improvement. Since the data will be spread out on either side of the buffer zone, the average seek length to access the data following an idle is reduced. However, this is the case only when the disk is nearly full. A disadvantage of placing the buffer zone at MD is the increased width of the buffer zone to provide suitable margins or shoulders on both sides thereof.

As shown in FIG. 1, the mid-diameter SBZ 30 bifurcates the data zone 14a into three portions or regions including the unprotected region of the SBZ 30 itself, and two shock protected portions radially inwardly and outwardly thereof having radial lengths C and D, respectively. In this embodiment, the SBZ 30 is spaced radially between the inner and outer boundaries 14b,c of the data zone 14a at a fixed radial position.

Figure 5:
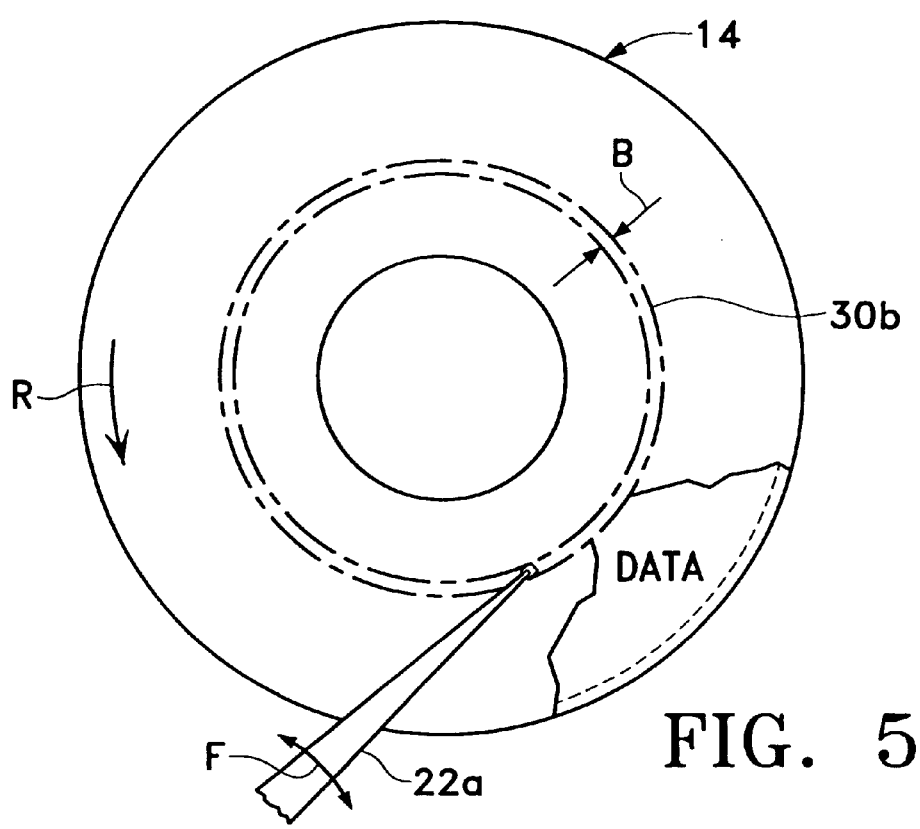
FIG. 5 is a schematic representation of the data storage disk illustrated in FIG. 1 having a sequentially relocatable shock buffer zone in accordance with another embodiment of the present invention.

A second possible implementation is to have a roving or relocatable buffer zone 30b that is located at the outer edge of user data in a drive as shown in FIG. 5. Such a buffer zone 30b would then be progressively moved from one edge of the disk to the other, as the disk space is used up. In this case, the surface previously used by the buffer zone would be made available to store user data after testing it and marking off any bad sectors.

The advantage of the relocatable buffer zone 30b is that there is no reduction in the capacity of the drive as seen by the user until the entire disk surface is used up. When this occurs, the user can be presented with an option to continue to store data at the expense of disabling the shock buffer zone, or to migrate to another HDD. Another advantage of using a relocatable buffer zone is that the slider will be idling close to the most recently written data. This can result in increased seek performance.

The main disadvantage of using a relocatable shock buffer zone is increased complexity in implementation. Since the actual usage of disk space is dictated by the file system, the only practical implementation will be at the operating system level. In addition, it may be difficult to implement a relocatable SBZ for disks with multiple partitions.

Figure 6:
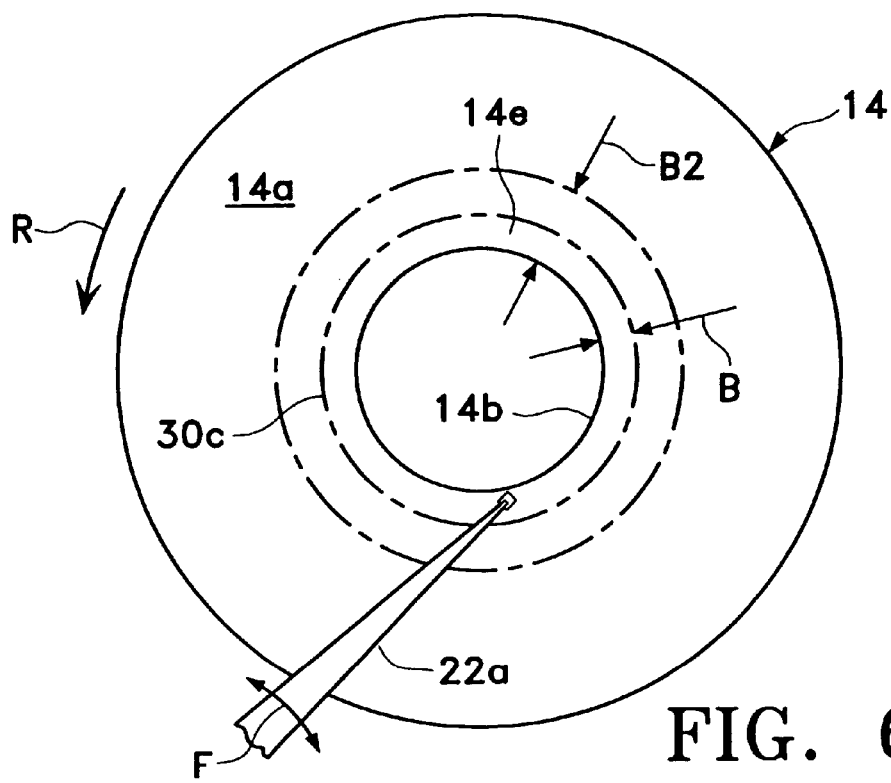
FIG. 6 is a schematic representation of the data storage disk illustrated in FIG. 1 having a shock buffer zone at the inner diameter thereof in accordance with another embodiment of the present invention.

In another embodiment illustrated in FIG. 6, a shock buffer zone 30c is located at the disk inner diameter (ID). One of the chief advantages of this placement is the reduced amplitude of disk vibration under the slider during shock mechanics. This reduction in disk mechanics sensitivity can increase the shock damage threshold. However, reduced air bearing stiffness can reduce the damage threshold. Experimental data indicates that the net change in damage threshold from ID to OD for 2.5" drives is small. Since the buffer zone is at a disk extremity, one of the shoulders in the buffer zone can be eliminated, thereby reducing the overall SBZ width. The ID SBZ 30c may also be located adjacent to the CSS zone 14e, or atop this zone to additionally save data space.

In addition, the net capacity reduction will be minimized for ID SBZ when used in drives with multi-zone recording. Since the data surface is contiguous, an ID SBZ is relatively easy to implement. The chief disadvantage will be in terms of disk performance, wherein the slider would have to be moved by large distances for both entering into and recovering from SBZ idle.

Figure 7:
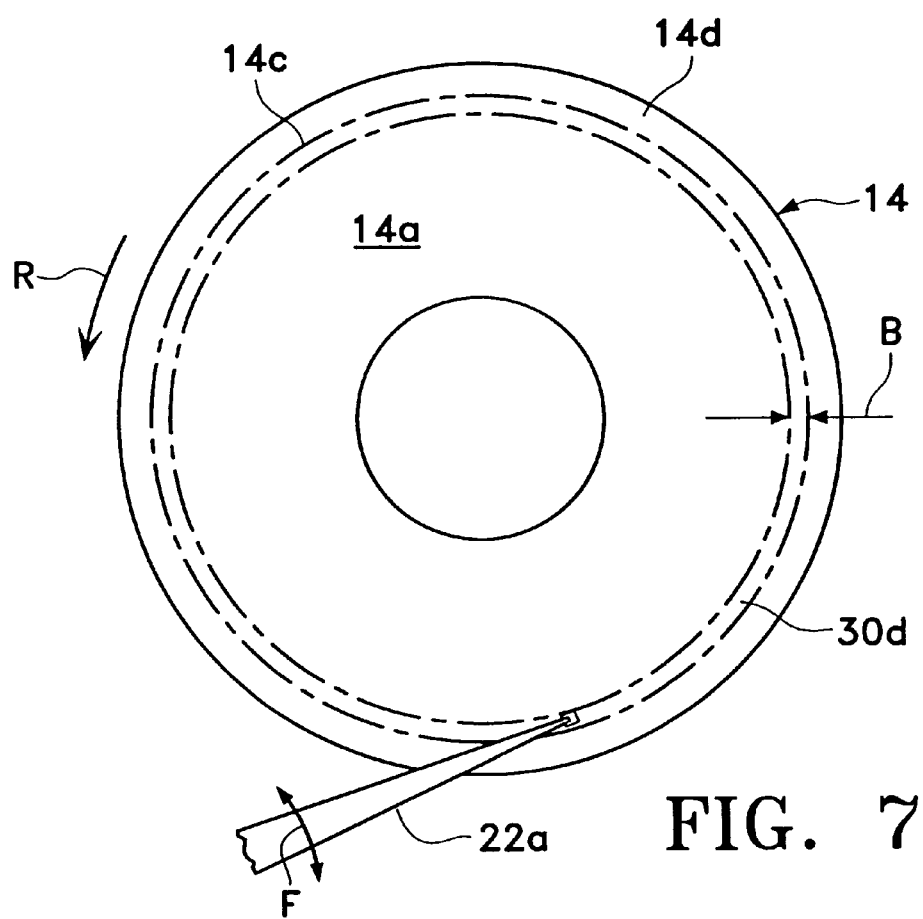
FIG. 7 is a schematic representation of the data storage disk illustrated in FIG. 1 having a shock buffer zone at the outer diameter thereof in accordance with another embodiment of the present invention.

In another embodiment illustrated in FIG. 7, a shock buffer zone 30d is located at the outer diameter (OD) of the disk surface adjacent the L/UL zone 14d, resulting in trade-offs similar to that of the ID case. The main difference is that the increase in shock failure threshold due to increased air bearing stiffness is achieved at the expense of increased disk vibration under the slider. At this time, the relative sensitivity of the damage threshold due to these two opposing factors is unknown. Only a detailed study of the operating HDI dynamics can reveal whether the damage threshold increases or reduces from ID to OD. A small advantage of OD SBZ as compared to the ID SBZ is that the slider would be near the OD after completion of a write operation wherein the conventional File Allocation Table is updated. This can result in a potential performance improvement, at least for entering into SBZ idle after write operations. As compared to the ID SBZ, placing the buffer zone at the OD can result in greater reduction in capacity for drives with multi-zone recording.

If the damage due to operating shock is very severe, it may not be desirable to fly over the damaged area. In this case, it is advantageous to move the Shock Buffer Zone to a different location. Since the user data is typically stored starting from OD, the SBZ 30c could be designed such that it is initially at the ID as shown in FIG. 6. If the zone is damaged to an extent that idling over the buffer zone is not possible, then the SBZ width is increased from width B to width B2. This would allow the slider to idle over a fresh undamaged area of the disk, i.e. the B2 minus B region. The decision to increase the SBZ width can be based on a shock sensor (not shown) embedded in the drive. It may be possible to use the conventional sensor used for write inhibit for this purpose. In this implementation, the buffer zone starts out as a small area at the ID and then progressively grows larger. If the zone can no longer be increased, the user can be notified to change the drive.

The core implementation of a Shock Buffer Zone 30 is quite simple. The SBZ driver 28 illustrated in FIG. 3 intercepts the disk commands from the computer. If the SBZ driver 28 is implemented with no latency or time delay, suitable software simply appends each read/write command with a seek to the center of the Shock Buffer Zone.

Since disk accesses typically occur in bursts, better performance can be obtained by waiting for some time before the slider 20 is sent to idle over the buffer zone. In this case, the SBZ driver starts the count-down clock timer 32 with a predetermined value following a read or write request as shown in FIG. 4. The timer 32 is preferably allowed to count down asynchronously, or independent of other processor activities. At the end of the timer cycle, an interrupt is generated which issues a seek command to send the slider 20 to the Shock Buffer Zone 30. If a new read or write command is issued from the computer during the middle of a count-down, the SBZ driver simply resets the timer 32 to the same predetermined value. In this way, the slider is set to SBZ idle only after a suitable time has elapsed. The actual SBZ idle time can be either set manually by the user (trading safety for performance), or changed automatically through an adaptive dynamic process.

The initial setup of the disk for an SBZ implementation requires one to set aside a number of tracks at a particular location on the drive for use as the Shock Buffer Zone. These tracks must not be used by the system to store permanent user data. Ideally, the SBZ implementation should be completely transparent to the system. The drive should appear as any other drive, with a capacity that is correspondingly smaller. The initial setup depends critically on the type of driver implementation; whether it is implemented in the operating system or in hardware.

Consider a typical disk access. The command to read or write to the disk 14 is conventionally generated either by an application software 10a or by the operating system software 10b suitably stored in memory in the computer 10 as shown in FIG. 3. The operating system 10b then sends the command to a conventional disk device driver 10c. The device driver sends the command to a suitable drive adapter 10d (such as a conventional IDE or SCSI card on the computer). The adapter routes the command to the appropriate disk where the disk drive controller 24 reads the command and performs the required operations. The software code for the Shock Buffer Zone can be implemented at any one of these levels.

Implementing the Shock Buffer Zone at the operating system 10b or device driver 10c level results in a purely software solution with no changes in any hardware. This type of an implementation can be used in any portable system, and with any operating system for which the SBZ is ported. In the case where the operating system is DOS, the SBZ driver can be implemented by patching the BIOS interrupt 13H at startup. In case of OS/2 or Windows 95, a separate device driver must be implemented. An OS/2 based SBZ can be implemented as a filter driver. In all cases, the initial setup of SBZ can be accomplished by either reserving a separate partition for the shock buffer zone, or by having a single system file therefor that is locked and immovable to define the SBZ.

The Shock Buffer Zone driver 28 may also be implemented in hardware at the card level by changing the firmware. Since all new cards have some type of logical to physical sector address translation, the initial setup can be easily implemented by changing the LBA (logical block addressing) scheme to skip over the shock buffer zone. In addition, a hardware timer can be added to the adapter to seek to the buffer zone at the appropriate time.

Implementing the SBZ driver 28 at the disk controller 24 level is identical to that of implementing it at the card level. Since the changes are at the disk level, this solution will work with any computer, and the drives can be transported between different computers transparently.

Implementation of the Shock Buffer Zone may result in a performance penalty during operation of the drive. Since the slider is preferably made to idle at a fixed track over the center of the buffer zone, the expected mean seek length, and therefore the time needed to execute a command, might increase. There is also a finite time needed to seek to the SBZ, but since this is done after a command is complete, it will not affect the performance unless the next access command comes in after the command to SBZ idle and before the seek to SBZ is complete. An accurate estimate of the performance penalty requires a detailed statistical analysis of the drive performance with and without the SBZ driver.

For example, the slider 20 may be in any of three states: idle at the SBZ 30; at the previous access position with the timer not yet being expired; or seeking to the SBZ 30 after timer expiration. The actual location of the SBZ on the disk 14, as well as the amount of data fullness on the disk also affect performance.

The safety of the data depends on whether or not the slider 20 is in the SBZ during the event of a shock. The probability of the disk being in SBZ idle depends on the disk usage pattern.

Accordingly, performance and data safety depend on various parameters which may be experimentally evaluated. In one test conducted, a portable computer having a hard disk drive was monitored during use for several days to obtain an exemplary trace of disk input output (I/O). Disk access typically occurs in bursts, with relatively large periods where the disk is not accessed. Different types of activities such as writing and compiling programs, typing reports on a word processor, updating a database, performing numerical computation, and creating presentation slides were performed. In each case, the computer was used heavily to increase the disk activity.

Although the exact probability density of time between disk access varies, the overall shape of the probability density curve remains the same for each type of activity. In each case, the bursts of disk I/O form a peak at about 50 msec, with long periods of inactivity forming an exponential tail of the distribution.

The probability of the slider 20 being in the SBZ may be calculated from the observed probability density of time between accesses, as a function of timer setting. Certain types of activities such as updating the database access the disk more frequently than others, resulting in lower probability of the slider being in the SBZ for the same timer setting. An estimate of the probability of the user data being safe under heavy computer use is obtained by averaging the values for all activities including programming, database, word processing, numerical analysis, and graphics applications.

The SBZ timer setting can be chosen to minimize the performance hit on data access time. In general, the performance of the disk drive is sharply reduced if the timer is set too low. In this case, the slider is sent to the SBZ even during bursts. In contrast, the performance nearly matches that of the original disk, without SBZ, when the timer value is moderate. From these observed results, an optimal timer setting of about 0.5 seconds is determined which corresponds with an 87% probability of data safety and a corresponding performance drop of only about 6% compared to a disk without the SBZ. An unprotected disk, of course, has no performance drop but also has no data safety factor since it can be damaged at any location.

The performance characteristics of the SBZ will vary with the state of the disk, or amount of recorded data therein; and the type of implementation whether at the ID, OD, or mid-diameter SBZ location. The implementation of the SBZ at the ID yields relatively poor performance when the disk is not completely full because the slider has to travel a larger distance to data from the buffer zone. In every other case, the performance in each case is close to the original disk, while providing a large degree of data safety.

A simple SBZ driver was implemented in software for proof of concept. The driver was implemented at the DOS level by patching the BIOS disk and timer interrupts. The disk interrupt was reprogrammed to set a timer following each disk I/O call from the operating system. The timer interrupt was programmed to determine if the appropriate time had elapsed after the last disk I/O. If the timer had expired, the timer interrupt would then send a command to the drive to send the slider to track 0. This corresponded to the first track of the data partition (D:) in the system, making this implementation similar to an OD based SBZ.

For the sake of implementation ease, no tracks were actually reserved for the SBZ, instead the slider was sent to fixed position where no data would be present in a real implementation. The driver was tested and found to successfully set the disk into SBZ idle mode by sending the slider to the appropriate position after the timer expired. The driver operated transparently to the operating system and application programs.

An important consideration in the implementation of SBZ is to ensure that disk benchmarking results are not adversely affected by the modification. A common benchmark used by the industry is PC BENCH. The "Disk Mix" test results by PC Bench are generally used to judge a drive against the competition. Under these benchmarking tests, a large number of sequential and random read and write operations are performed on the drive and the data throughput to and from the disk measured. The benchmark program stresses the disk very severely by making a very large number of disk I/O in a very short period of time. Hence it is not representative of actual disk usage by any user. Nevertheless, it is important to ensure that any implementation of the Shock Buffer Zone should not adversely affect the benchmarking results due to the competitive nature of the disk drive industry.

A series of benchmarking tests were run on a PC with and without a SBZ driver. The SBZ timer was set to different time intervals and tested. In each case, the presence of the Shock Buffer Zone driver did not result in a significant drop in data throughput. It is important to note that the disk did not remain idle for extended periods of time when the benchmarking tests were being executed, and the disk entered the SBZ mode only a few times.

Accordingly, user data in a hard disk drive can be protected from shock damage during operating conditions by using a Shock Buffer Zone where the slider can idle most of the time. The SBZ can be implemented at many levels, either in hardware or in software. Using a SBZ increases data integrity dramatically from 0% to over 87% while resulting in a performance loss of just 6% in one example. The Shock Buffer Zone can be used as a new idle mode that replaces the power saving low-power idle mode in battery-powered disk drives, trading a slightly larger power consumption for vastly increased data integrity.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A data storage device 12 comprising:
    a disk 14 having an annular surface zone 14*a* extending radially between inner and outer boundaries 14*b,c* for storing data;
    means 16 for spinning said disk 14;
    an access head 18 mounted on a slider 20 for writing data to and reading data from said data zone 14*a;*
    means 22 for flying said head 18 across said data zone 14*a;* and
    means 28 for seeking said slider 20 to a predetermined shock buffer zone 30 atop said spinning disk during an idle mode when said data is neither written to nor read from said data zone 14*a*.

2. A device according to claim 1 wherein:
    said flying means 22 include said slider 20 configured for effecting an air bearing 26 atop said spinning disk; and
    said slider 20 and shock buffer zone 30 have corresponding widths A,B, with said shock buffer zone width B being at least as large as said slider width A.

3. A device according to claim 2 wherein said shock buffer zone 30 is disposed in said data zone 14*a* to define shock protected and unprotected regions thereof.

4. A device according to claim 3 wherein said seeking means 28 are configured to progressively relocate said shock buffer zone 30*b* radially as said data zone 14*a* is progressively filled with said data from one of said two boundaries 14*b,c*.

5. A device according to claim 3 wherein said seeking means 28 are configured to locate said shock buffer zone 30 at a fixed radial position.

6. A device according to claim 5 wherein said seeking means 28 are configured to space said shock buffer zone 30 radially between said inner and outer boundaries 14*b,c* of said data zone 14*a*.

7. A device according to claim 5 wherein said seeking means 28 are configured to locate said shock buffer zone 30*d* at said outer boundary 14*c*.

8. A device according to claim 5 wherein said seeking means are configured to locate said shock buffer zone 30c at said inner boundary 14b.

9. A device according to claim 3 wherein said seeking means 28 are configured to return said slider 20 immediately to said shock buffer zone 30 after accessing data in said data zone 14a.

10. A device according to claim 3 wherein said seeking means 28 are configured to return said slider 20 to said shock buffer zone 30 upon a predetermined time delay after accessing data in said data zone 14a.

11. A device according to claim 10 wherein said time delay is about 0.5 seconds.

12. A device according to claim 3 wherein said data zone 14a includes a plurality of tracks, and said seeking means 28 are configured to reference said tracks to center said slider 20 in said shock buffer zone 30.

13. A device according to claim 3 in combination with a programmable computer 10, and further comprising:

application software 10a stored in said computer 10;

disk operating system software 10b stored in said computer 10;

a device driver 10c operatively joined between said computer 10 and said data storage device 12 for driving operation thereof; and wherein said seeking means 28 are effective for intercepting disk commands from said computer to said flying means 22 to effect said shock buffer zone 30.

14. A method for enhancing data integrity stored in a data zone 14a of a spinning disk 14 accessible by a slider 20 mounted access head 18, comprising:

flying said access head 18 across said data zone 14a to write data thereto and read data therefrom; and seeking said slider 20 to a predetermined shock buffer zone 30 atop said spinning disk 14 during an idle mode when said data is neither written to nor read from said data zone 14a.

15. A method according to claim 14 wherein said shock buffer zone 30 is disposed in said data zone 14a to define shock protected and unprotected regions thereof.

16. A method according to claim 15 wherein said shock buffer zone 30b is progressively relocated radially as said data zone 14a is progressively filled with said data from one of two boundaries 14b,c bounding said data zone 14a.

17. A method according to claim 15 wherein said slider 20 is returned to said shock buffer zone 30 upon a predetermined time delay after accessing data in said data zone 14a.

18. A method according to claim 17 wherein said time delay is selectively variable.

19. A method according to claim 15 further comprising moving said buffer zone to a different location atop said spinning disk upon damage to said disk at said predetermined zone.

20. A method according to claim 15 further comprising:

writing temporary data on said disk at said buffer zone; and writing permanent data on said disk outside said buffer zone.

* * * * *